Dec. 18, 1928.
I. L. WORDEN
1,695,357
AUTOMOBILE ANTIGLARE SHIELD
Filed March 19, 1927
Fig. 1.
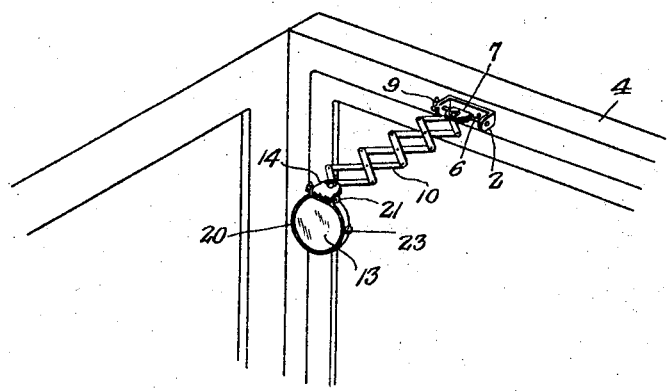
Fig. 2.
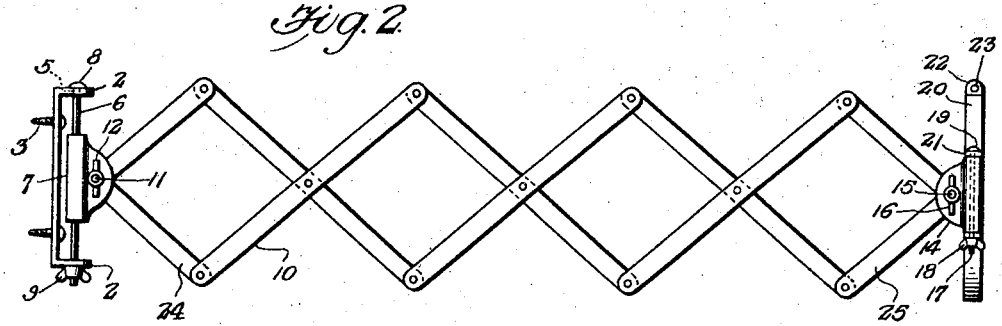
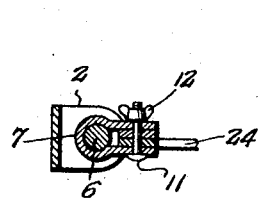
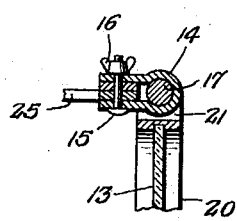
Fig. 3.
Fig. 4.
Inventor
I. L. Worden,
By
Attorney Patented Dec. 18, 1928.

1,695,357

UNITED STATES PATENT OFFICE.

IRA L. WORDEN, OF WICHITA, KANSAS.

AUTOMOBILE ANTIGLARE SHIELD.

Application filed March 19, 1927. Serial No. 176,707.

The invention relates to an automobile anti-glare shield.

The object of the present invention is to provide a simple, practical, and efficient anti-glare device of strong, durable and comparatively inexpensive construction adapted to be conveniently and securely fastened on the inside of a car adjacent the top of the windshield and designed to be arranged either directly in front of the driver or a little to the left or at any other desired place where it might prove practical, and adapted to be shifted either to the right or the left of the driver or directly in front of the eyes of the driver at the desired distance therefrom to protect the vision from the sun rays coming through either the right or left hand window of the car or the front thereof, and also from the glare of the headlights of an approaching automobile, train, or other glaring light, whereby a car may be safely driven during either the night or day without such rays of light affecting the vision.

A further object of the invention is to provide an anti-glare device of this character adapted to be quickly and firmly secured in any adjustment and capable also of providing a frictional engagement of the parts sufficient to retain the anti-glare device at any adjustment and at the same time permit the position of the device to be changed without manipulating adjustable fastening means.

With these and other objects in view, the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings:

Figure 1 is a perspective view of an anti-glare device constructed in accordance with this invention and shown applied to an automobile.

Fig. 2 is an enlarged plan view of the anti-glare device.

Fig. 3 is a detail sectional view through the bracket and clamp.

Fig. 4 is a detail sectional view through the clamp in which the adjustable anti-glare shield is mounted.

In the accompanying drawings in which is illustrated the preferred embodiment of the invention, the automobile anti-glare device comprises in its construction a horizontal bracket constructed of suitable metal and consisting of a body portion and outwardly extending terminal portions or ears 2 and secured by screws 3 or other suitable fastening devices to an automobile 4, preferably at the top of the windshield. The bracket may be secured to the frame of the windshield or to any other convenient portion of the automobile, and it may be placed directly in front of the driver or a little to the left or at any other place which may be found practical. The ears 2 are provided with aligned perforations 5 through which passes a rod 6 forming a pivot for a clamp 7 and provided at one end with a head 8 and threaded at the other end to receive a thumb nut 9 by means of which the rod may be clamped in the bracket.

The clamp 7, which is constructed of suitable metal, is approximately U-shaped in cross section, and is composed of spaced sides and a connecting portion which is curved to conform to the configuration of the pivot 6. The clamp which connects a lazy tongs supporting member 10 is of a length less than the distance between the ears 2, and is adjustable along the pivot rod and its sides are pierced by a screw 11 having a thumb nut 12 and forming a pivot at one end of the lazy tongs supporting member. The lazy tongs supporting member is extensible and is also adapted to swing on the pivot bolt 11 and also on the pivot 6 to enable the supporting member to be swung upward or downward or to the right or to the left and the thumb nuts will enable the supporting member to be secured in any adjustment.

The lazy tong supporting member is extensible to enable an anti-glare shield 13 to be arranged the desired distance from the eyes of the driver, and it is connected with the lazy tongs supporting member by means of a clamp 14 of substantially the same construction as the clamp 7. The clamp 14 is approximately U-shaped in cross section and its sides like the clamp 7 are preferably tapered, as shown, but the clamps 7 and 14 may be of any desired configuration, as will be readily understood. The sides of the clamps 14 are pierced by a pivot bolt 15 having a thumb nut 16 and adapted to be manipulated to firmly hold the clamp in any desired adjustment. The clamp 14 receives a pivot screw or rod 17 having a thumb nut 18 at one end and a head 19 at its other end and connected with a metallic rim 20 of the shield 13 by suitable ears 21. The rim 20 is preferably constructed of a single piece of metal having out-turned terminals 22 connected by a suitable screw 23 adapted to be manipulated to properly adjust the rim on the shield 13. The shield may be constructed of glass, celluloid, or any other suitable material, and may be of any desired color, such as green or amber, for protecting the eyes of the driver from the rays of the sun, glaring headlights of automobiles, and other bright lights. The shield is adapted to be swung on the pivot bolt 15 and also on the pivot 17 to arrange it in front of or at either side of the free end of the lazy tongs supporting member, or in any intermediate position. Also the shield is adapted to be swung on the pivot bolt 17 to arrange it in the plane of the lazy tongs supporting member and also in a plane at an angle to that of the lazy tongs supporting member, and when arranged in a plane at an angle to that of the lazy tongs supporting member, it may be adjusted to a central, side, or any intermediate position. The adjustment of the shield will enable it to be arranged directly in front of the eyes of the driver and at the desired distance from the driver. Also it may be arranged at either side of the driver for protecting the driver from rays of light entering either the right or left hand window of the automobile. The thumb nuts will enable the shield to be firmly secured at any adjustment in front or at either side of the driver, or the thumb nuts may be adjusted to provide a frictional engagement of the clamps with the pivots and with the lazy tongs supporting member for yieldably retaining the shield at any adjustment and for enabling the shield and the supporting member to be moved to any desired position without manipulating the fastening device. The shield is adapted to be arranged sufficiently close to the eyes of the driver to give a goggle effect and its various adjustments will enable it to properly function under all conditions of day and night driving, as well as temperature and weather conditions. Any other suitable means may be employed for connecting the pivot with the rim of the shield and the terminal bars 24 and 25 are half length bars and form tapered ends to the lazy tongs supporting member for enabling the same to swing laterally in the pivot of the clamp 7 and also for permitting free lateral swinging of the clamp 14 on the free end of the lazy tongs supporting member. When the device is not in use, it may be swung upwardly and compactly folded out of the way by shortening the extensible lazy tongs supporting member as much as possible.

What I claim is:

An automobile anti-glare shield comprising a fixed horizontal bracket having spaced projections, a horizontal pivot supported by the said projections, a clamp consisting of a plate doubled on itself to form a bearing sleeve and to provide a pair of spaced ears, the sleeve being arranged on the said pivot to permit a vertical swinging movement of the clamp and the latter being of a width less than the space between the projections to permit sliding movement of the clamp on the pivot, a lazy tong supporting member normally operating in a horizontal plane and having one end pivoted between the said ears for lateral swinging movement, the outer end of the lazy tong supporting member being free, a shield normally arranged in a vertical plane and depending from the free end of the lazy tong supporting member and provided at its top with a transverse pivot, and a clamp consisting of a plate doubled on itself to provide a bearing sleeve and a pair of ears, the bearing sleeve of the second clamp receiving the shield and the ears of the said second clamp receiving and pivoted to the free end of the lazy tong supporting member.

In testimony whereof I have hereunto set my hand.

IRA L. WORDEN.